United States Patent
Torata et al.

(10) Patent No.: US 8,669,010 B2
(45) Date of Patent: Mar. 11, 2014

(54) NONAQUEOUS SECONDARY BATTERY

(75) Inventors: Naoto Torata, Osaka (JP); Kazuo Yamada, Osaka (JP); Satoshi Okano, Osaka (JP); Naoto Nishimura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 85 days.

(21) Appl. No.: 12/989,508

(22) PCT Filed: Apr. 23, 2009

(86) PCT No.: PCT/JP2009/058086
§ 371 (c)(1),
(2), (4) Date: Oct. 25, 2010

(87) PCT Pub. No.: WO2009/131184
PCT Pub. Date: Oct. 29, 2009

(65) Prior Publication Data
US 2011/0039161 A1 Feb. 17, 2011

(30) Foreign Application Priority Data
Apr. 24, 2008 (JP) ................. 2008-114164

(51) Int. Cl.
*H01M 4/66* (2006.01)
*H01M 2/16* (2006.01)

(52) U.S. Cl.
USPC .............. 429/233; 429/57; 429/127; 429/247

(58) Field of Classification Search
USPC .................... 429/57, 129, 233, 247
See application file for complete search history.

(56) References Cited

U.S. PATENT DOCUMENTS

| | | | |
|---|---|---|---|
| 6,432,576 B1 * | 8/2002 | Hikmet | 429/162 |
| 2006/0099493 A1 * | 5/2006 | Nishimura et al. | 429/62 |
| 2006/0105243 A1 * | 5/2006 | Okamura et al. | 429/234 |
| 2007/0184350 A1 * | 8/2007 | Kim et al. | 429/247 |
| 2007/0224505 A1 * | 9/2007 | Kita et al. | 429/231.1 |
| 2008/0038631 A1 | 2/2008 | Nakura et al. | |
| 2008/0085452 A1 * | 4/2008 | Park | 429/220 |

FOREIGN PATENT DOCUMENTS

| | | | | |
|---|---|---|---|---|
| CN | 101019266 | | 8/2007 | |
| JP | 10-6453 | | 1/1998 | |
| JP | 10-255754 | | 9/1998 | |
| JP | 11-102711 | * | 4/1999 | H01M 4/66 |
| JP | 2001-126697 | | 5/2001 | |
| JP | 2004-253270 | * | 9/2004 | H01M 2/34 |
| JP | 2004-311339 | | 11/2004 | |
| JP | 2006-269359 | | 10/2006 | |

OTHER PUBLICATIONS

International Search Report for PCT/JP2009/058085, mailed Jun. 2, 2009.

(Continued)

*Primary Examiner* — Ula C Ruddock
*Assistant Examiner* — Amanda Barrow
(74) *Attorney, Agent, or Firm* — Nixon & Vanderhye P.C.

(57) ABSTRACT

A nonaqueous secondary battery comprises a positive electrode, a negative electrode and a separator interposed between the positive electrode and the negative electrode, wherein at least one of the positive electrode and the negative electrode is provided with a current collector composed of a film-like or fibrous resin layer having a conductive layer on both sides, and the separator has a higher thermal deformation temperature than the resin layer.

12 Claims, 1 Drawing Sheet

(56) References Cited

OTHER PUBLICATIONS

O'Regan, B. et al., "A Low-Cost, High Efficiency Solar Cell Based on Dye-Sensitized Colloidal TiO2 Films", Nature, vol. 353, (1991), pp. 737-740.

Wadman, S.H. et al., "Cyclometalated Ruthenium Complexes for Sensitizing Nanocrystalline TiO2 Solar Cells", Chemical Communications, vol. 19, (2007), pp. 1907-1909.

Cheung, K. et al., "Direct Functionalization of the Cyclometalated 2-(2'-pyridyl)phenyl Ligand Bound to Iridium (III)", Journal of Organometallic Chemistry, vol. 690, No. 1, (2005), pp. 2913-2921.

* cited by examiner

NONAQUEOUS SECONDARY BATTERY

This application is the U.S. national phase of International Application No. PCT/JP2009/058086 filed 23 Apr. 2009, which designated the U.S. and claims priority to Japan Application No. 2008-114164 filed 24 Apr. 2008, the entire contents of each of which are hereby incorporated by reference.

TECHNICAL FIELD

The present invention relates to a nonaqueous secondary battery. More particularly, the present invention relates to a nonaqueous secondary battery with improved safety.

BACKGROUND ART

A kind of a nonaqueous secondary battery in which a positive electrode is a metal oxide, an electrolyte is an organic electrolytic solution, a negative electrode is a carbon material such as graphite, and a porous separator is used between the positive electrode and the negative electrode is called as a lithium-ion secondary battery (also simply referred to as a "battery"). Since its production at first in 1991, it has been rapidly and widely employed in view of its higher energy density as a battery for a mobile instrument such as a mobile telephone which has been reducing in size and weight.

In addition, a lithium ion secondary battery (large-capacity battery) having enlarged capacity to store power generated has been researched. It was also reported that the large-capacity battery was manufactured by simply upsizing a conventional battery in a case.

Since the lithium-ion secondary battery employs the organic electrolytic solution as the electrolyte, several measures are taken to prevent incidents such as blowout, fire or the like under harsh conditions. One of the measures is to assure safety by a function called "shut-down function", that is, when the battery temperature rises, the separator melts to bung up holes of the separator, so that the current is shut down.

However, the problems associated with the safety of the battery have arisen even for the batteries to which these measures are taken. For example, a current flow is concentrated in a short-circuited portion due to external obstacles (a nail is stuck or the like) or internal obstacles (mixing extraneous matters or the like) to generate heat by resistance heating, so that a chemical reaction of an active material and the electrolytic solution in the battery is caused by the heat. As a result, the so-called "heat overdrive" is caused in the battery so that an incident such as blowout or fire happens at the worst.

Among a number of suggestions for the measures, there is one suggested lithium-ion secondary battery in which a current collector composed of a resin film and a metal layer on the surface of the resin film is used for the positive electrode and/or the negative electrode (Patent Document 1: Japanese Unexamined Patent Publication No. HEI 11(1999)-102711).

In the battery including such a current collector, when abnormal heat generation arises, the resin film is melted down to break the positive electrode and/or the negative electrode. As a result, the temperature rise in the battery is restricted to prevent fire.

PRIOR ART DOCUMENTS

Patent Document

Patent Document 1: Japanese Unexamined Patent Publication No. HEI 11(1999)-102711

SUMMARY OF THE INVENTION

Problems that the Invention is to Solve

In the battery including the current collector in the above document, when abnormal heat generation arises, the positive electrode and/or the negative electrode may be broken by melting down of the resin film of the current collector, so that the current flowing through both the electrodes may be cut off. However, when an abnormal reaction is locally caused, the separator is melted down earlier than the melting down of the resin film owing to abrupt temperature rising due to this reaction, so that the problems may arise in which short circuit within the battery cannot be prevented.

In the general battery, comparing the area of the separator with that of the positive electrode, the area of the separator is larger. It is necessary to assure portions for sealing the separator within a predetermined area. When it is assumed that the area of the positive electrode is enlarged in the case of a large-capacity battery, the larger the area of the positive electrode is, the smaller the proportion of the sealed portions is. Therefore, in the case where the proportion of the area for allowing for thermal contraction to the area of the positive electrode is smaller, and if short circuit is caused within the battery, the separator cannot allow for the thermal contraction, so that internal short circuit may be caused more easily than that in the battery for the mobile instrument in which the above-mentioned proportion of the area is relatively larger.

Means for Solving the Problems

Therefore, according to the present invention, there is provided a nonaqueous secondary battery comprising a positive electrode, a negative electrode and a separator interposed between the positive electrode and the negative electrode, wherein at least one of the positive electrode and the negative electrode is provided with a current collector composed of a film-like or fibrous resin layer having a conductive layer on both sides, and the separator has a higher thermal deformation temperature than that of the resin layer.

Effect of the Invention

In the case of short circuit externally caused by sticking a nail or short circuit internally caused by mixing extraneous matters within the battery, the battery of the present invention functions so that at first the resin layer constituting the current collector is melted down, whereby the current flowing through the positive electrode and the negative electrode is shut down. Further, the battery of the present invention can prevent internal short circuit due to shrinkage of the separator caused at the ends of the electrodes.

The battery of the present invention having the above functions provides improved safety even when the temperature rises.

Further, in a large-capacity battery, a current flows several times as much as the conventional mobile battery. If the present invention is applied to such a large-capacity battery produced even by simply upsizing the conventional one, it becomes easier to prevent internal short circuit due to the shrinkage of the separator caused at the ends of the electrodes when the temperature rises.

As compared with a current collector composed only of a metal foil used in the conventional nonaqueous secondary battery, the amount of a metal being used can be reduced. As a result, weight-reduction of the battery and cost reduction by reducing the amount of the metal being used is possible.

MODE FOR CARRYING OUT THE INVENTION

Figure 1:
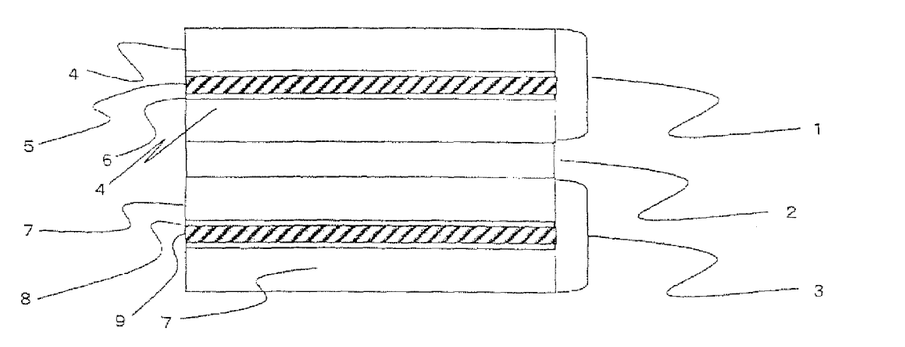
FIG. 1 is a schematic configuration diagram illustrating a battery according to the present invention.

FIG. 1 is a schematic configuration drawing illustrating, as an example, a nonaqueous secondary battery (a lithium-ion secondary battery) according to the present invention. Herein, though the lithium-ion secondary battery is primarily explained, the present invention can be applied to any non-aqueous secondary battery other than the lithium-ion secondary battery.

In FIG. 1, electrodes 1 and 3 including active material layers are provided (the reference numeral 1 is a positive electrode, the reference numeral 3 is a negative electrode, the reference numeral 4 is an active material layer in the positive electrode and the reference numeral 7 is an active material layer in the negative electrode), and a separator 2 is provided. A current collector comprises resin layers 5 and 9, and conductive layers 6 and 8. The thermal deformation temperature of the separator 2 is higher than that of the resin films 5 and 9. Though the current collector is used in both the positive electrode and the negative electrode in FIG. 1, it is possible to use it for only either of them.

The current collector is configured so that the conductive layers 6 and 8 are formed on both sides of the resin layers 5 and 9, respectively.

As the current collector, a material having electrical conductivity is used to collect electricity from ions given and received by the positive electrode and the negative electrode in accordance with the charge and discharge of the secondary battery.

The resin layer is film-like or fibrous.

As the material of the resin layer, plastics can be used which are thermally deformed with a rise in temperature. For example, polyolefin resins such as polyethylene (PE), polypropylene (PP) and the like, and a resin film such as polystyrene (PS) and the like, whose thermal deformation temperature is 150° C. or less, can be listed. The resin material for the resin layer and the separator may be the same material. In addition, as long as the resin material varies in thermal deformation temperature and coefficient of thermal shrinkage or the like depending upon the difference in the manufacturing steps and working process, it can be used for both the resin film and the separator.

The film-like resin layer may be one manufactured by any manufacturing method such as a uniaxial orientation, a biaxial orientation and a non-drawing method.

The fibrous resin layer may be one made of either a cloth or a nonwoven fabric. The conductive layer formed on the resin layer may be positioned on only both the sides of the resin layer or may be positioned on both the sides of the resin layer as a result of covering each fiber constituting the resin layer with the conductive layer. In view of assuring the supportability for the active material and the strength of the current collector, it is preferable that the amount of a resin fabric per area of the current collector be in the range of 50-300 g/m², and, more preferably, it is 70-150 g/m². It is preferable that the thickness of the current collector be in the range of 0.05-10 mm. When the thickness is thinner than 0.05 mm, the supportability for the active material and the strength of the current collector may not be sufficiently assured. When it is thicker than 10 mm, the volume proportion of the current collector in the battery is enlarged, so that the battery capacity cannot be enlarged. More preferably, the thickness of the current collector is in the range of 0.08-1 mm.

A method for forming the conductive layer is not particularly limited. Any method of deposition, sputtering, electro plating, electroless plating, bonding or the like and the combination thereof can be applied. A part of the conductive layer may be uncovered with a metal film and a resin fiber may be exposed.

When each fiber is covered with the conductive layer in the fibrous resin layer, the conductive layer can be formed with the same method as above. Further, it is preferable that the conductive layer of the positive electrode is made of aluminum, titanium or nickel, and the conductive layer of the negative electrode is made of copper or nickel.

In view of assuring that the current collector can collect sufficiently electricity, it is preferable for the current collector to have a specific resistance of 10 Ω·cm or less with supporting the active material. More preferably, it is 1.5 Ω·cm or less.

The separator can be properly selected from, for example, a nonwoven fabric, a cloth and a microporous membrane or the like such as a plastic fiber, a glass fiber and a natural fiber or the like of electrical insulation. Among them, it is preferable to be a nonwoven fabric and a microporous membrane such as polyethylene, polypropylene, polyester, aramid-based resin and cellulose-based resin or the like in view of their stable properties or the like. In particular, it is preferable to be a nonwoven fabric and a microporous membrane made of an aramid-based, polyester or cellulose-based resin. Some plastic nonwoven fabrics and plastic microporous membranes have an additional function to, when the battery abnormally generates heat, melt down the separator by the heat to shut down the current between the positive and negative electrodes, and therefore they can be preferably used in the light of safety.

But, it is essential that the thermal deformation temperature of the separator is higher than that of the resin layer. Having such a temperature relation, the resin film constituting the current collector of the electrodes is melted down to shut down the current before the shut down function of the separator is activated. Further, it is preferable that the thermal deformation temperature of the separator be higher by 10° C. or more than that of the resin layer, because it is easy to shut down the current also upon abrupt temperature rising. A method for measuring the thermal deformation temperature will be described in the section of examples.

It is preferable that the coefficient of thermal shrinkage of the separator interposed between the positive electrode and the negative electrode be smaller than that of the resin layer having the conductive layer on both the sides, namely, the current collector. With keeping the relation of the coefficient of thermal shrinkage, internal short circuit can be prevented which is caused due to the problems in the conventional battery that the separator is shrunk at first in the event of abnormal heat generation. It is preferable that the coefficient of thermal shrinkage of the separator be smaller by 1.0% or more than that of the current collector. The coefficient of thermal shrinkage is a value measured at 120° C. A method for measuring the coefficient of thermal shrinkage will be described in the section of examples.

It is preferable that the coefficient of thermal shrinkage of the separator used for the present invention be less than 1.0% at 120° C. or less. With such a coefficient of thermal shrinkage, the current shut-down effects by the resin layer and the separator enable the current to be shut down in the two steps, thereby improving the safety of the battery.

It is preferable that the coefficient of thermal shrinkage of the separator be 1.0% or less at 180° C. or less. Using such a separator having this coefficient of thermal shrinkage, internal short circuit between the positive electrode and the negative electrode can be prevented which is caused due to the problems that the separator is shrunk upon the heat generation in the battery, so that it is difficult for the abrupt heat generation to arise. Especially, if the battery has a battery capacity of 30 Wh or more and a thickness of 3.9 mm or more in a laminate structure of the electrode and the separator or roller-up portions, it can be prevented that the abrupt temperature rising is liable to generate by internal short circuit.

The thickness of the separator is not particularly limited, but it may be enough that the thickness makes it possible to retain a necessary amount of electrolytic solution, and the thickness can prevent the short circuit between the positive electrode and the negative electrode. For example, it is about 0.01-1 mm and, preferably, it is about 0.02-0.05 mm. It is preferable that the air resistance of the separator is 1-500 sec/cm$^3$ in order to assure the strength enough to prevent internal short circuit in the battery with sustaining a low internal resistance of the battery.

The shape and the size of the separator are not particularly limited, but it may be possible to be a quadrilateral shape such as a square, a rectangle or the like; a polygon; a circle; or any other shape. When the separator is laminated with the positive and negative electrodes, it is preferable for the separator to be larger than the positive electrode and, in particular, preferable for the separator to have a similar figure which is slightly larger than the positive electrode and slightly smaller than the negative electrode.

Conventionally, the shape of the lithium-ion secondary battery is restricted by that of a battery can. Therefore, the widely-used shape of the battery is of a "rolled-up type", focusing on productivity, in which the positive electrode, the negative electrode and the separator of each strip type are rolled-up. On the other hand, as far as the battery using a laminate film as the outer material is concerned, shaping is easier, so that the lithium-ion secondary battery is further reduced in weight and is freely shaped in addition to the reduction in weight and the high capacity of the battery. Especially, the battery of the "laminate type" in which the above materials are laminated can be used preferably for the large-capacity battery having a large-area electrode. Therefore, it is preferable that the coefficient of thermal shrinkage of the current collector be 1% or more at 120° C. or more. Besides, the present invention can be applied to the rolled-up type battery.

In particular, when the battery has a capacity of 30 Wh or more and a thickness of 3.9 mm or more in a laminate of the electrode and the separator or the roller-up portions, it is highly likely that the meltdown of the separator is caused earlier than the shut down of the current due to the fusion of the resin layer. In such a case, it is especially preferable that the coefficient of thermal shrinkage of the separator is 1.0% or less at 180° C., because it is difficult for the separator to be melted down, so that the positive and/or the negative electrodes are broken due to the fusion of the resin layer of the current collector to permit the cut off of the current flowing through both the electrodes. For the material of the separator, aramid-based resins, polyester-based resins, cellulose-based resins and the like are listed.

The lithium-ion secondary battery usually includes an electrolyte. Generally, an electrolytic solution as an electrolyte is used containing an organic solvent and an electrolytic salt.

Examples of the organic solvent include cyclic carbonates such as propylene carbonate (PC), ethylene carbonate (EC), butylene carbonate and the like; linear carbonates such as dimethyl carbonate, diethyl carbonate, ethyl methyl carbonate, dipropyl carbonate and the like; lactones such as γ-butyrolactone, γ-valerolactone and the like; furans such as tetrahydrofuran, 2-methyltetrahydrofuran and the like; ethers such as diethyl ether, 1,2-dimethoxyethane, 1,2-diethoxyethane, ethoxymethoxyethane, dioxane and the like; dimethyl sulfoxide; sulfolane; methylsulfolane; acetonitrile; methyl formate; methyl acetate; and the like. Two or more kinds of these organic solvents may be mixed.

Examples of the electrolytic salt include lithium salts such as lithium borofluoride ($LiBF_4$), lithium phosphofluoride ($LiPF_6$), lithium trifluoromethanesulfon ($LiCF_3SO_3$), lithium trifluoroacetate ($LiCF_3COO$), lithium trifluoromethanesulfonyl imide ($LiN(CF_3SO_2)_2$) and the like. Two kinds or more of the electrolytic salts may be mixed.

Further, a gel electrolyte retaining the electrolytic solution in a polymer-matrix or an electrolyte composed of ionic liquid can be used.

The positive electrode includes the active material layer. The active material layer in the positive electrode may be formed on both sides of the current collector (as denoted by reference numeral 4 of FIG. 1, for example) or only one side of the current collector at the side of the separator.

As the active material in the positive electrode, an oxide containing lithium is named. Specifically, there are named $LiCoO_2$, $LiNiO_2$, $LiFeO_2$, $LiMnO_2$, $LiMn_2O_4$ and materials in which the transition metal elements of these active materials in the positive electrode are partially substituted with other metal elements. In particular, during usual operation, 80% or more of the amount of lithium contained in the active material in the positive electrode can be used for battery reaction, thereby dissolving problems due to overcharge and enhancing safety. As such an active material in the positive electrode, materials having a spinel structure such as $LiMn_2O_4$ or materials having an olivine structure represented by $LiMPO_4$ (M is at least one or more kinds of elements selected from Co, Ni, Mn and Fe) can be named. In particular, an active material in the positive electrode using Mn and Fe is preferable in the light of cost saving.

As a more preferable active material in the positive electrode, $LiFePO_4$ is named in the light of safety and a charging voltage. Usually, with increasing temperature, the active material in the positive electrode releases oxygen to burn the electrolyte to thereby generate heat more violently. However, in $LiFePO_4$, all the oxygen elements are combined with phosphorus with tight covalent bonds, so that with increasing temperature, it is very difficult for the active material in the positive electrode to release oxygen, which is preferable in the light of safety. Since it contains phosphorus, an antiflash effect can be expected. In the battery of $LiFePO_4$, further, the charging voltage is about 3.5 V, so that the charging operation is essentially finished at about 3.8 V to have an allowance up to the voltage for decomposing the electrolytic solution. Therefore, if loading characteristics defined by a battery include a polarization of the electrodes, it is possible to charge the battery by increasing the charging voltage, which is further preferable.

When an active material in the positive electrode whose charging voltage reaches 4 V or more is used, further increase in the charging voltage leads to the decomposition of the electrolytic solution can be easily caused. Therefore, when the polarization is large as above, the charging operation performed at an increased charging voltage may affect cycle characteristics, which is not preferable. Besides, in the battery of LiFePO$_4$, the voltage of the battery increases abruptly at the end of the charging operation, so that it is very easy to detect the full charge, and even when the batteries are in combination, the accuracy of detecting a voltage is not required to be so severe, advantageously.

The negative electrode includes the active material layer. The active material layer in the negative electrode may be formed on both sides of the current collector (as denoted by reference numeral 7 of FIG. 1, for example) or only one side of the current collector at the side of the separator.

Examples of the active material in the negative electrode include high crystalline graphites represented by natural graphites, artificial graphites of particle-like (squamate, aggregated, fibrous, whisker-like, spherical, granular type or the like) and graphite products such as mesocarbon microbeads, mesophase pitch powder and isotropic pitch powder and the like; non-graphitizing carbons of resin sintered carbons; and the like. Two kinds or more of them may be mixed. Further, alloy-based materials having a larger capacity such as an oxide of Sn and a silicon-based active material in the negative electrode and the like can be used.

Besides, a nonaqueous secondary battery, to which the present invention can be applied other than a lithium-ion secondary battery, is a metal lithium secondary battery or the like.

EXAMPLE

The present invention will be explained specifically in terms of examples, but the present invention is not limited thereto at all.

Example 1

As an active material in a positive electrode, 100 parts by weight of LiCoO$_2$, 10 parts by weight of acetylene black (DENKA BLACK: manufactured by DENKI KAGAKU KOGYO KABUSHIKI KAISHA, Japan) as a conductive member, 10 parts by weight of PVDF (KF polymer manufactured by KUREHA CORPORATION, Japan) as a binder and N-methyl-2-pyrrolidone (referred to as NMP, hereinbelow) as a solution were used to make a paste for preparing a positive electrode. As shown in FIG. 1, this paste was applied to both sides of the current collector comprising an aluminum conductive layer of 1 μm in thickness on both sides of a biaxially oriented polypropylene film of 20 μm in thickness (a resin layer of Pylen® manufactured by TOYOBO CO., LTD, Japan, having a heat deformation temperature of 140° C. and a coefficient of thermal shrinkage of 2.3% at 120° C.). It was sufficiently dried and pressed with a hydraulic press to obtain a positive electrode (the size of the coating of the positive electrode: 30 mm in width×40 mm in length).

The heat deformation temperature and the coefficient of thermal shrinkage mean values obtained by the following methods.

The heat deformation temperature means a temperature at which the resin layer starts to heat-shrink. The thermal shrinkage temperature is measured by repeating the steps of: measuring the coefficient of thermal shrinkage after retaining a sample for a given time at a constant temperature within a thermostatic chamber; and, if it is not shrunk, increasing the temperature; or, if it is shrunk, decreasing the temperature. Specifically, the coefficient of thermal shrinkage is measured after retaining a sample for 15 minutes at 100° C. If the coefficient of thermal shrinkage is 20% or less, a new sample is used and the temperature is increased to 105° C., at which the sample is retained for 15 minutes to measure the coefficient of thermal shrinkage. These steps are repeated until the temperature reaches 150° C. and a temperature at the time when the coefficient of thermal shrinkage is 10% or more is defined to be the heat deformation temperature.

The coefficient of thermal shrinkage is measured by selecting two points on the resin layer at an interval of 50 [mm] or more, so that a distance between the points is measured with a slide gauge. Then, after the resin layer is heated to 120° C. (the separator is heated to 180° C. also) for 15 minutes, the distance between the same points is measured again to obtain a coefficient of thermal shrinkage based on the measurements before and after the heating. Based on this measurement method, three or more distances between points in the longitudinal direction and three or more distances between points in the lateral direction of the resin layer are measured. A mean value of the coefficient of thermal shrinkage calculated by each measurement is defined and adopted finally as the coefficient of thermal shrinkage of the resin layer. For each of the longitudinal direction and the lateral direction of the resin layer, two points located 10% or less distant from the edge of the resin layer and one point located about 50% distant from the edge of the resin layer are at least selected as measurement points for the between-point distances. A larger value in either the longitudinal direction or the lateral direction of the resin layer was defined as the coefficient of thermal shrinkage.

Next, as an active material in a negative electrode, 100 parts by weight of natural graphite made in China (the average particle diameter was 15 μm, d002-0.3357 nm and BET specific surface area was 3 m$^2$/g), 12 parts by weight of PVDF as a binder and NMP as a solution were used to make a paste for preparing a negative electrode. As shown in FIG. 1, this paste was applied to both sides of the current collector comprising a copper conductive layer of 1 μM in thickness on both sides of a biaxially oriented polypropylene film of 20 μm in thickness (a resin layer of Pylen® manufactured by TOYOBO CO., LTD, having a heat deformation temperature of 140° C. and a coefficient of thermal shrinkage of 2.3%). It was sufficiently dried and pressed with a hydraulic press to obtain a negative electrode (the size of the coating of the negative electrode: 32 mm in width×42 mm in length).

As a separator, a microporous membrane was used which was made of an aramid-based resin of 33 mm in width, 45 mm in length and 25 μm in thickness having a heat deformation temperature of 150° C. or more, a coefficient of thermal shrinkage of 0.1% or less at 120° C. and a coefficient of thermal shrinkage of 0.4% at 180° C.: BLC-1420A manufactured by JAPAN VILENE COMPANY, LTD.) This separator, the above positive and negative electrodes were laminated in the order of: the negative electrode/the separator/the positive electrode/the separator/the negative electrode/the separator/the positive electrode/the separator/the negative electrode/the separator/the positive electrode/the separator/the negative electrode/the separator/the positive electrode/the separator/the negative electrode/the separator/the positive electrode/the separator/the negative electrode. Further, tab-welding was performed to each of the positive and negative electrodes. The obtained laminate structure was inserted into an aluminum laminate in the form of a bag having three sides among four sides were fusion bonded.

As an electrolytic solution, LiPF$_6$ of 1.5 M was dissolved into a solvent obtained by mixing ethylene carbonate (EC) and dimethyl carbonate (DMC) in a volume ratio of 1:1. Such an electrolytic solution was injected into the aluminum laminate sustained under a reduced pressure. After returned under atmospheric pressure, the remaining side of the aluminum laminate was bonded to be sealed by thermal fusion to produce a battery. The obtained battery was subjected to a charging and discharging test under the following conditions.

Charging: A constant current-a low voltage charging, in which a charging current was 0.1 C and a cutoff voltage was 4.2 V, was performed for 15 hours or a charging current of 10 $mA_{cut}$.

Discharging: A discharging was evaluated in which a discharging current was 0.2 C, 0.5 C and 1 C, and a cutoff voltage was 3.0 $V_{cut}$.

A discharge capacity was determined by a period of time taken when discharging was performed until the voltage reached 3.0 V.

Further, after the above current characteristics were measured, a nail of a diameter of 2.5 mm was stuck into a full charged battery in a nail penetration test in which the nail was stuck and penetrated through the battery at a speed of 1 mm/s to observe behavior and a surface temperature of the battery.

Example 2

A battery was manufactured with the same method as in example 1 except that the current collector for the positive electrode was changed to an aluminum foil (20 μm in thickness). The current characteristics of the obtained battery were measured. The battery was subjected to the nail penetration test to observe behavior and a surface temperature of the battery.

Example 3

A battery was manufactured with the same method as in example 1 except that the current collector for the negative electrode was changed to a copper foil (12 μm in thickness). The current characteristics of the obtained battery were measured. The battery was subjected to the nail penetration test to observe behavior and a surface temperature of the battery.

Compared Example 1

A battery was manufactured with the same method as in example 1 except that the current collector for the positive electrode was changed to an aluminum foil (20 μm in thickness) and the current collector for the negative electrode was changed to a copper foil (12 μm in thickness). The current characteristics of the obtained battery were measured. The battery was subjected to the nail penetration test to observe behavior and a surface temperature of the battery.

Table 1 shows the characteristics of the batteries measured in examples 1 to 3 and compared example 1.

TABLE 1

| | Battery | 1.0 C/0.2 C | Results of nail penetration test | |
|---|---|---|---|---|
| | Capacity (Ah) | (Capacity Ratio) | Behavior | Max. Surface Temperature |
| Example 1 | 1.0 | 0.89 | No Change | 68° C. |
| Example 2 | 1.1 | 0.91 | No Change | 64° C. |
| Example 3 | 1.0 | 0.93 | No Change | 72° C. |
| Compared Example 1 | 1.1 | 0.94 | The cell was filled out, exploded and fired immediately after the nail was stuck. | Not measured |

Table 1 indicates that the batteries in the examples, in which a film-like resin layer was used for the current collector, provide similar battery capacity and capacity ratio as compared with the battery of the compared example in which a film-like resin layer was not used, and did not show any change in behavior in the nail penetration test and restricted the rising of the maximum surface temperature.

Example 4

A battery was manufactured with the same method as in example 1 except that the size of coating for the positive electrode was 200 mm in width×150 mm in length, and the size of coating for the negative electrode and the size of the separator were 205 mm in width×158 mm in length. The battery was subjected to the nail penetration test to observe behavior and a surface temperature of the battery.

As a result, it was observed that the battery did not show any change in its state in the nail penetration test and the maximum surface temperature was restricted to be 48° C.

Example 4 indicates that when the battery capacity is enlarged by enlarging the size of the electrodes, the maximum surface temperature of the battery can be restricted even upon occurrence of internal short circuit. Then, it was confirmed that the battery of example 4 was improved in safety.

Examples 5 to 7

Batteries were manufactured with the same method as in example 1 except that the size of coating for the positive electrode was 70 mm in width×125 mm in length, and the size of coating for the negative electrode was 78 mm in width 130 mm in length.

A separator made of an aramid-based resin of 25 μm in thickness and having the same size as the size of coating for the negative electrode was used (having a heat deformation temperature of 200° C. or more, a coefficient of thermal shrinkage of 0.1% or less at 120° C. and a coefficient of thermal shrinkage of 0.4% at 180° C.: BLC-1420A manufactured by JAPAN VILENE COMPANY, LTD.) The separator, the positive and negative electrodes were laminated in the order of the negative electrode/the separator/the positive electrode/the separator/the negative electrode in example 5. The thickness of the laminate structure was 0.5 mm. Similarly, 5 layers of the positive electrode and 6 layers of the negative electrode were laminated in example 6, and 10 layers of the positive electrode and 11 layers of the negative electrode were laminated in example 7. The thickness of the laminate structures in examples 6 and 7 were 2.0 mm and 3.9 mm, respectively.

Further, tab-welding was performed to each of the positive and negative electrodes. Each of the obtained laminate structures was inserted into a stainless steel can which was then welded. An electrolytic solution of 25 [ml] obtained by dissolving $LiPF_6$ of 1 [mol/L] into a mixed solvent of ethylene carbonate (EC) and dimethyl carbonate (DMC) at EC:DMC=50:50 (volume ratio) was injected into the stainless steel can to complete the battery.

Five batteries were manufactured in each of examples 5 to 7. The batteries were subjected to the nail penetration test to observe behavior and a surface temperature of the battery.

Charging: A constant current-a low voltage charging, in which a charging current was 0.1 C and a cutoff voltage was 4.2 V, was performed for 15 hours or a charging current of 10 $mA_{cut}$.

Discharging: A discharging current was 0.2 C, 0.5 C and 1 C, and a cutoff voltage was 3.0 $V_{cut}$.

Further, after the above current characteristics were measured, a nail of a diameter of 2.5 mm was stuck into a full charged battery in a nail penetration test in which the nail was stuck and penetrated through the battery at a speed of 1 mm/s to observe behavior and a surface temperature of the battery.

Examples 8 to 10

Batteries were manufactured with the same method as in examples 5 to 7 except that as a separator, a microporous membrane made of a polyolefin was used having a heat deformation temperature of 150° C., a coefficient of thermal shrinkage of 2.0% at 120° C. and a coefficient of thermal shrinkage of 10% or more at 180° C.). The characteristics of the obtained batteries were measured. The thickness of the laminate structures in examples 8 to 10 was 0.4 mm, 2.0 mm and 3.8 mm, respectively. The batteries were subjected to the nail penetration test to observe behavior.

Table 2 shows the characteristics of the batteries measured in examples 5 to 10.

TABLE 2

| | | Sheets of Positive Electrodes | Sheets of Negative Electrodes | Kind of Separator | Energy Capacity (Wh) | Laminate Thickness (mm) | Nail penetration test (number) | | |
|---|---|---|---|---|---|---|---|---|---|
| | | | | | | | No Change | Smoke | Fired |
| Example | 5 | 1 | 2 | aramid | 3.0 | 0.5 | 5 | 0 | 0 |
| | 6 | 5 | 6 | aramid | 15.2 | 2.0 | 5 | 0 | 0 |
| | 7 | 10 | 11 | aramid | 30.3 | 3.9 | 5 | 0 | 0 |
| | 8 | 1 | 2 | polyolefin resin | 3.0 | 0.4 | 5 | 0 | 0 |
| | 9 | 5 | 6 | polyolefin resin | 15.2 | 2.0 | 5 | 0 | 0 |
| | 10 | 10 | 11 | polyolefin resin | 30.3 | 3.8 | 4 | 1 | 0 |

Table 2 indicates that the batteries of examples 5 to 10, in which the battery capacity was 30 Wh and the thickness of the laminate structure comprising the electrodes and the separator, or that of the rolled-up portions was 3.9 mm or more, can prevent internal short circuit even in the event of abrupt temperature rising by using the separator whose coefficient of thermal shrinkage was 1.0% or less at 180° C. to provide a nonaqueous secondary battery with improved safety.

Example 11

A current collector, OX-7617 (T-3) 282 manufactured by JAPAN VILENE COMPANY, LTD. was used (having a heat deformation temperature of 130° C. and a coefficient of thermal shrinkage of 5.3% at 120° C.). This current collector was composed of a nickel film of 215 g/m² as a metal film formed on a surface of a polyolefin-based resin fiber (85 g/m²). The finished size was 1.1 mm in thickness and the porosity was 92%.

As a separator, a microporous membrane made of an aramid-based resin (BLC1420A) manufactured by JAPAN VILENE COMPANY, LTD. was used. The separator had a heat deformation temperature of 150° C. or more, a coefficient of thermal shrinkage of 0.1% or less at 120° C. and a coefficient of thermal shrinkage of 0.4% at 180° C. and a coefficient of thermal shrinkage of 1.0% or less at 230° C.

As an active material in the positive electrode, LiFePO$_4$ of an olivine structure was used; as a conductive member, acetylene black was used; as a thickening agent, CMC was used; and as a binder, a water base binder was used, being mixed in a ratio of the active material in the positive electrode:the conductive member:the thickening agent:the binder=100:6:2:2 (weight ratio). These materials were mixed with water to make a paste for preparing a positive electrode.

As an active material in the negative electrode, an artificial graphite was used; as a thickening agent, CMC was used; and as a binder, a water base binder was used, being mixed in a ratio of the active material in the negative electrode:the thickening agent:the binder=98:1:1 (weight ratio). These materials were mixed with water to make a paste for preparing a negative electrode.

As a nonaqueous electrolytic solution, LiPF$_6$ of 1.5 M dissolved into a solvent obtained by mixing ethylene carbonate (EC) and dimethyl carbonate (DMC) at EC:DMC=1:1 (volume ratio) was used.

Using the above-mentioned current collector, separator, pastes for preparing the positive electrode and the negative electrode, and nonaqueous electrolytic solution, a battery of a capacity of 4 Ah was prepared and obtained by the following method.

1 (Positive Electrode)

The paste for the positive electrode was rubbed into the current collector cut into an area of 8 cm in width and 17 cm in length so as to leave a no-coating region at a region about 1 cm from an end of one side, and it was preliminarily dried at 60° C. for 20 minutes, and it was finally dried at 100° C. for 20 minutes, and then it was pressed to prepare a positive electrode.

The amount of the supported active material in the positive electrode was 820 g/m² per area of the current collector.

2 (Negative Electrode)

The paste for the negative electrode was rubbed into the current collector cut into an area of 9 cm in width and 18 cm in length so as to leave a no-coating region at a region about 1 cm from an end of one side, and it was preliminarily dried at 60° C. for 20 minutes, and it was finally dried at 100° C. for 20 minutes, and then it was pressed to prepare a negative electrode.

The amount of the supported active material in the negative electrode was 380 g/m² per area of the current collector.

3 (Sealing by Separator)

Two sheets of the separator cut into an area of 9 cm in width and 18 cm in length were used to sandwich the positive electrode and thermally sealed at its periphery to obtain a positive electrode sealed with the separator.

4 (Laminate)

While the no-coating region of the negative electrode was opposed to that of the positive electrode, the negative electrode and the positive electrode sealed with the separator were successively laminated to provide a laminate. The number of repetitions of the lamination was 4 sheets of the negative electrode and 3 sheets of the positive electrode sealed with the separator for providing a predetermined capacity (4 Ah).

5 (Providing Output Terminals)

After the lamination, for the no-coating regions of the negative and positive electrodes, a negative lead (not shown) of nickel of 0.1 mm in thickness for output was connected to the negative electrode by ultrasonic welding and a positive lead (not shown) of aluminum of 0.1 mm in thickness for output was connected to the positive electrode.

7 (Can Packaging)

The above laminate was placed within a can formed with an iron material plated with nickel, and 25 ml of the nonaqueous electrolytic solution was injected thereto. A lid was made of the same iron material plated with nickel. The periphery of the lid was welded and sealed by laser.

A lithium-ion secondary battery was manufactured by the above method. The size of the battery was 10 cm in width, 19 cm in length and 1 cm in thickness. The battery capacity was 4 Ah.

Example 12

A battery was manufactured with the same method as in example 11 except that the current collector for the negative electrode was changed to a copper foil (12 μm in thickness). The battery capacity was 4 Ah.

Example 13

A battery was manufactured with the same method as in example 11 except that 13 sheets of the negative electrode and 12 sheets of the positive electrode were laminated to attain a battery capacity of 18 Ah. Besides, the size of the battery was 10 cm in width, 19 cm in length and 4 cm in thickness.

(Evaluation of the Batteries of Examples 11 to 13)

(1) Charging and Discharging Test

Concerning the batteries of examples 11 and 12, a constant current of 400 mA (equivalent to 0.1 C) charged each battery up to a battery voltage of 3.6 V and then a constant voltage of 3.6 V charged it for 3 hours, and then the battery was discharged at a constant current of 800 mA (equivalent to 0.2 C) down to a battery voltage of 2.25 V.

Concerning the battery of example 13, as in the case of the battery having a capacity of 4 Ah, a constant current of 1800 mA equivalent to 0.1 C charged the battery up to a battery voltage of 3.6 V and then a constant voltage charged it for 3 hours, and then the battery was discharged at a constant current of 3600 mA equivalent to 0.2 C down to a battery voltage of 2.25 V.

(2) Nail Penetration Test

A nail of a diameter of 3 mm was stuck into a full charged battery in which the nail was stuck and penetrated through the battery at a speed of 1 mm/s. Table 3 shows the results.

TABLE 3

| | No. of Positive Electrodes | No. of Negative Electrodes | Kind of Separator | Energy Capacity (Ah) | Nail penetration test Behavior |
|---|---|---|---|---|---|
| Example 11 | 11 | 3 | 4 | aramid | 4 | No change |
| Example 12 | 12 | 3 | 3 | aramid | 4 | No change |
| Example 13 | 13 | 12 | 13 | aramid | 18 | No change |

Table 3 indicates that a nonaqueous secondary battery using a fibrous resin layer as the current collector also prevented internal short circuit upon abrupt temperature rising and provided improved safety.

DESCRIPTION OF THE REFERENCE NUMERALS

1: positive electrode
2: separator
3: negative electrode
4: active material layer in the positive electrode
5, 9: resin layer
6, 8: conductive layer
7: active material layer in the negative electrode

The invention claimed is:

1. A nonaqueous secondary battery comprising:
a positive electrode;
a negative electrode; and
a separator interposed between the positive electrode and the negative electrode,
wherein at least one of the positive electrode and the negative electrode is provided with a current collector composed of a resin layer having a conductive layer on both sides, and the separator has a higher thermal deformation temperature than that of the resin layer; wherein
the separator and the resin layer have an active material layer interposed therebetween, which functions as part of the positive electrode or the negative electrode.

2. The nonaqueous secondary battery according to claim 1, wherein the separator has a smaller linear coefficient of thermal shrinkage after retaining for 15 minutes at 120° C. than that of the resin layer.

3. The nonaqueous secondary battery according to claim 1, wherein the separator has a linear coefficient of thermal shrinkage of 1.0% or less after retaining for 15 minutes at 180° C.

4. The nonaqueous secondary battery according to claim 1, wherein the separator includes an aramid-based resin, a polyester, or a cellulose-based resin.

5. A nonaqueous secondary battery comprising:
a positive electrode;
a negative electrode; and
a separator interposed between the positive electrode and the negative electrode,
wherein at least one of the positive electrode and the negative electrode is provided with a current collector composed of a resin layer having a conductive layer on both sides, the separator has a higher thermal deformation temperature than that of the resin layer, and
the both sides of the resin layer, are perpendicular to a direction that the positive electrode, the separator and the negative electrode are laminated.

6. The nonaqueous secondary battery according to claim 5, wherein the separator has a smaller linear coefficient of thermal shrinkage after retaining for 15 minutes at 120° C. than that of the resin layer.

7. The nonaqueous secondary battery according to claim 5, wherein the separator has a linear coefficient of thermal shrinkage of 1.0% or less after retaining for 15 minutes at 180° C.

8. The nonaqueous secondary battery according to claim 5, wherein the separator includes an aramid-based resin, a polyester, or a cellulose-based resin.

9. The nonaqueous secondary battery according to claim 1, wherein the both sides of the resin layer, are perpendicular to a direction that the positive electrode, the separator and the negative electrode are laminated.

10. The nonaqueous secondary battery according to claim 9, wherein the separator has a smaller linear coefficient of thermal shrinkage after retaining for 15 minutes at 120° C. than that of the resin layer.

11. The nonaqueous secondary battery according to claim 9, wherein the separator has a linear coefficient of thermal shrinkage of 1.0% or less after retaining for 15 minutes at 180° C.

12. The nonaqueous secondary battery according to claim 9, wherein the separator includes an aramid-based resin, a polyester, or a cellulose-based resin.

* * * * *